No. 802,344. PATENTED OCT. 17, 1905.
J. WILKES.
LOGARITHMIC CALCULATING APPARATUS.
APPLICATION FILED MAR. 22, 1905.
2 SHEETS—SHEET 1.
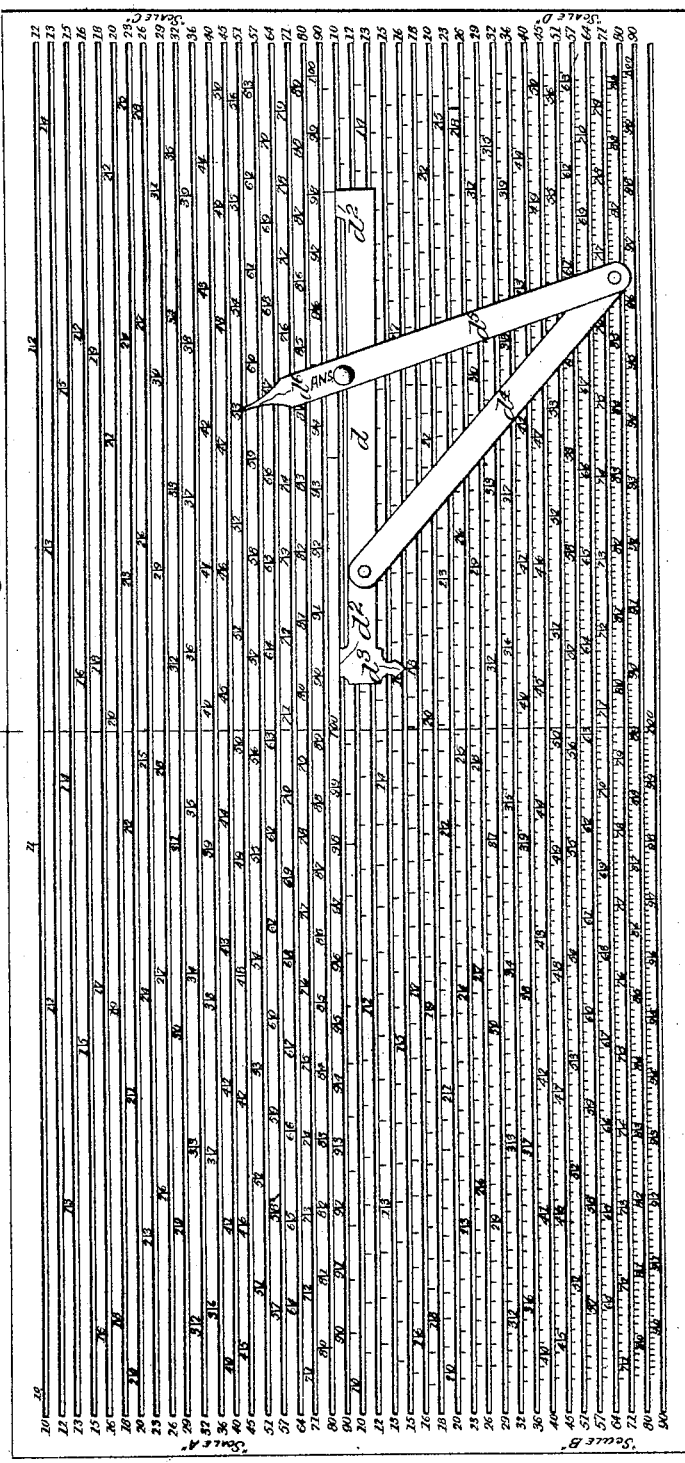
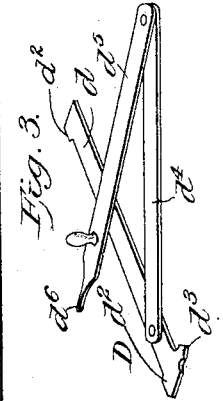
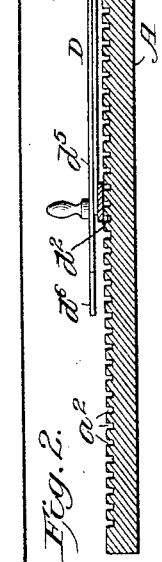
INVENTOR
John Wilkes, No. 802,344. PATENTED OCT. 17, 1905.
J. WILKES.
LOGARITHMIC CALCULATING APPARATUS.
APPLICATION FILED MAR. 22, 1905.
2 SHEETS—SHEET 2.
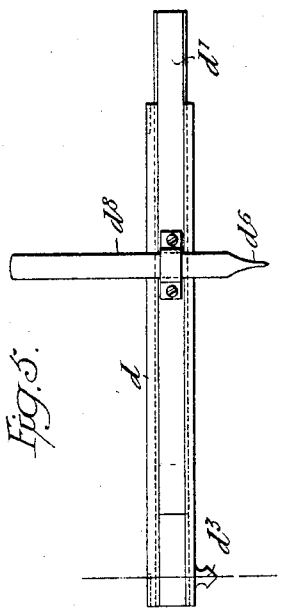
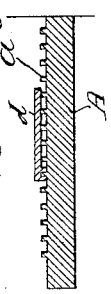
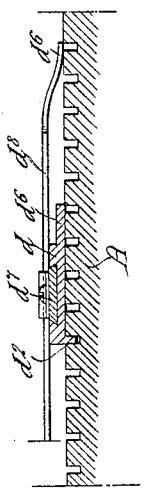
Witnesses:
T. W. Birckhead.
A. C. Powell
Inventor
John Wilkes,
By Howson & Howson
Attorneys

UNITED STATES PATENT OFFICE.

JOHN WILKES, OF NASHVILLE, TENNESSEE.

LOGARITHMIC CALCULATING APPARATUS.

No. 802,344.  Specification of Letters Patent.  Patented Oct. 17, 1905.

Application filed March 22, 1905. Serial No. 251,476.

*To all whom it may concern:*

Be it known that I, JOHN WILKES, a citizen of the United States, and a resident of Nashville, county of Davidson, and State of Tennessee, have invented certain new and useful Improvements in Logarithmic Calculating Apparatus, of which the following is a specification.

My invention relates to logarithmic calculating apparatus; and one object is to provide a logarithmic scale of great length which shall, however, be within small compass and of such form that the whole calculator can be cheaply manufactured.

Another object is to provide a device of the general character noted which shall be of such a construction that its practical use will be easy, rapid, and certain even to those not trained in mathematics and unused to the reading of lineal sliding scales of the ordinary forms—such as the familiar slide-rule, for example—or other substantially similar apparatus in which two scales are in juxtaposition unavoidably producing mental confusion to the inexperienced. This mental confusion preventing, as I think, the wider use of such logarithmic calculators, I aim to avoid it by adopting a construction that will leave no doubt as to where to look for the answer and by having only a single scale in sight where the answer is to be read.

These objects I attain as hereinafter set forth, reference being had to the accompanying drawings, in which—

Figure 1 is a plan view of my improved logarithmic scale, showing also one form of the indicator forming part of my invention and used with said scale. Fig. 2 is a sectional elevation on the line 2 2 of Fig. 1. Fig. 3 is a perspective view of the indicator shown in Fig. 1. Fig. 4 is a fragmentary sectional elevation illustrating a form of construction of indicator and supporting-scale tablet which is the equivalent of that shown in Figs. 1 and 2; and Figs. 5 to 7, inclusive, are respectively a plan view, a side, and an end elevation, of a modified form of indicator.

In order to secure accuracy and precision in the result obtained, a logarithmic scale should be of relatively great length, while for convenience in use it should occupy but a relatively small space, and this is accomplished according to my invention by dividing or cutting up the scale into sections of exactly equal lengths and placing such sections parallel to each other upon a suitable surface. The intervals or spaces between successive sections are made exactly equal, and the left-hand ends of the sections are lined up in a manner similar to that common in the arrangement of the lines of printed matter in books, &c. If but one such scale is employed, there is the possibility in the solution of certain problems by means of my device that the index or pointer of the indicator forming a part of said invention and hereinafter described may fall outside the limits of said scale, and to provide against this I place four exactly-similar scales adjacent to one another in the same plane and designated as scales A, B, C, and D, respectively. Scale B is placed adjacent to and below scale A in such manner that the distance of the last line of scale A from the first line of scale B is the same as the distance between the successive lines of the scales. Similarly, scale D is placed below scale C in the same manner, and both of these latter scales are placed to the right of scales A and B, so that scale C is a longitudinal continuation of scale A, while scale D is in the same manner a continuation of scale B, this being effected by placing the beginning of the second line of scale C in juxtaposition to the end of the first line of scale A, and so on. This causes the last line of scale C to be a continuation of the next to last line of scale A, and the second line of scale D to be a continuation of the first line of scale B, and the last line of scale D to be a continuation of the next to last line of scale B.

While it will be understood that any number of scales arranged as above described may be placed adjacent to one another, both side by side and respectively above and below each other, I have found that four scales arranged as shown is a convenient form of the device.

Each of the four scales is a logarithmic scale—that is, one in which the distance from the beginning of the scale to any number corresponds to the mantissa of the logarithm of that number—each scale being laid off in prime divisions from "10" to "100," while each prime division is as finely subdivided as may be required, in the present instance into ten parts. Convenient dimensions for the surface upon which the scale may be mounted are twenty by ten inches, each one of the four scales including twenty longitudinal lines one-quarter of an inch apart, so that each scale will be two hundred inches, or sixteen and two-thirds feet long, and the total length of all four scales A, B, C, and D will be approximately sixty-five feet.

The logarithmic scales may be stamped or engraved on any suitable plane surface or tablet, as A, which may be of any desired material, as wood, vulcanite, or metal, or they may be printed on paper, cloth, &c., and attached to a plane surface in any suitable manner. In the forms of the device shown in Figs. 1 and 2 a groove is cut in the tablet directly above and exactly parallel to each longitudinal line of the scale, being made to extend the whole length of each of said lines from one side of said tablet to the other. The edges of the grooves are uniform parallel straight lines and the grooves themselves are adapted to receive projections from an indicator, hereinafter described. The shape and size of the grooves and the arrangement and dimensions of the projections on the indicator designed to fit therein are not material, provided only that the construction is such as to firmly hold the indicator when it is placed upon the scale and while its arms are being moved into the desired positions. It must also be possible to easily place the indicator upon and remove it from the scale.

The indicator D, as shown in Figs. 1 to 4, inclusive, consists of three bars pivotally connected together and formed of any desired material, usually wood or metal. The bar $d$, forming the base-piece of the indicator, has a straight edge $d'$ and two projections $d^2$ designed to enter and movably fit within the grooves in the tablet A, in addition to which an index-pointer $d^3$ projects from the second longitudinal edge of said bar $d$, adjacent to one end of the same. A second bar $d^4$ is pivoted to the base-bar $d$ some distance from one end in such manner that it may be swung in a complete circle in a plane substantially parallel to the surface of the scale when the instrument is in use. This joint is so made that while it will permit the arm $d^4$ to be easily and smoothly turned it will yet have sufficient friction to retain said arm in any position in which it may be placed. At the free end of the arm $d^4$ is fastened a third arm $d^5$, usually of substantially the same length as and also so constructed as to be free to swing in a circle around its point of pivotal connection with said second bar and that in a plane also parallel to the plane of the scale. This joint is also made as to cause the bar $d^5$ to be retained in any position in which it is set, and both it and the joint between the bars $d$ and $d^4$ may be provided with any desired means whereby it is possible to tighten the connection when this becomes loose. Inasmuch, however, as such tightening means, which is preferably of the same construction as is commonly employed in calipers or compasses, forms no part of the present invention, I have not illustrated the same.

The bar $d^5$ terminates in an indicating-point $d^6$ and may be marked or stamped with the word "Answer," inasmuch as in operation it is used to indicate or point out the result of a calculation.

While the length of the bars may be varied within wide limits, depending upon the size of the scale with which the indicator is to be used, said arm must be of sufficient length for the two indicating-points $d^6$ and $d^3$ to simultaneously point to two graduations of one scale which are of a maximum distance apart. In other words, the arms must be of such length that the point $d^6$ can be made to indicate any one of the graduations of a given scale when the pointer $d^3$ is at "1" of that scale. The bars must also be of such proportions that, if desired, the point $d^6$ of the arm $d^5$ may be made to exactly coincide with the index-point $d^3$ on the bar $d$. This is usually accomplished by making the arm $d^5$ slightly shorter than the arm $d^4$.

If desired, I may provide a scale-supporting body or tablet with a series of upwardly-extending ridges, tongues, or projections, as shown at $a^5$ in Fig. 4, and form a recess or recesses in the under face of the indicator, so that it may be guided upon said tablet as before, this construction, however, being considered by me as the equivalent of that shown in Figs. 1 and 2.

If desired, the indicator may be made as illustrated in Figs. 5 to 8, inclusive, in which case the base-piece $d$ is longitudinally slotted for the reception of a sliding piece $d^7$, which is the equivalent of the arm $d^4$ in that form of indicator shown in Figs. 1 to 3, inclusive. This sliding piece or slide carries any desired form of guide or clip for a third arm $d^8$, which is movable at right angles to the first two arms and is provided at one end with an indicating-pointer $d^6$, as before. The base-bar $d$ has projections $d^2$, which fit into the grooves $a^2$ of the scale-carrying surface. In operation this form of indicator is as a whole operated in a manner similar to that outlined in connection with the other forms of my device, the second bars $d^7$ and $d^8$ being moved in their guideways to bring the indicating-point $d^6$ to any desired figure or position upon the scale, after which the indicator as a whole is moved as hereinafter described.

It will be understood that the grooves for the reception of the projections on the indicator may be made in any desired way, though if the scale-supporting body or tablet be of metal they may be cut by a milling-machine. It is, however, possible to make the tablet with its grooves, graduations, and figures all at one operation in the same manner as is commonly used in the printing trade for making electrotypes—viz., depositing copper upon a wax mold by the well-known electroplating process and then filling in the thin copper shell so formed with a suitable backing. It is especially when the latter form of construction is adopted that I prefer to use ridges instead of grooves as a means for keeping the indicator in proper position.

The above-described apparatus is adapted to the working of all mathematical problems which can be stated under the form $x = \frac{a}{b} \times c$, including problems in multiplication, division, proportion, fractions, interest, areas, weights, measures, &c. The proper statement of such problems and the manner of solving them by means of a logarithmic scale, being well understood in the art, will not be described at length, though the following examples are given by way of illustration: The product of one number multiplied by another may in accordance with the above be stated as $x = \frac{a}{1} \times c$, and in a given case let $a$ equal four and $c$ equal seven. If now the indicator be placed on the tablet or scale so that its index-pointer $d^3$ is opposite "100" and both projections $d^2$ of the bar $d$ be in the proper groove $a^2$ to hold it stationary, then the arm $d^5$ is so moved that its end $d^6$ is exactly opposite the number "40" on the scale. The indicator as a whole is then lifted without changing the relative positions of its arms and replaced upon the scale in such position that its index-point $d^3$ will indicate "70." It will then be found that the end $d^6$ of the arm $d^5$ points to "28" on the scale, which is the result desired.

The quotient of one number divided by another may be stated as $x = \frac{a}{b} \times 1$. Then if in a given case $a$ equals seventy-two and $b$ equals eight the index-pointer $d^3$ should be set at "80" and the end $d^6$ at "72." The indicator is then bodily raised and, with its projections $d^2$ in the proper groove, is placed so that its index-pointer $d^3$ will be at "1." The end $d^6$ will then indicate the answer "90" or "9." The most general case is that of proportion, which may be stated as $x = \frac{a}{b} \times c$, and let it be assumed that $a$ equals five, $b$ equals fifteen, and $c$ equals nine. The indicator is now so set that the point $d^3$ will be at "15" and the end $d^6$ at "5," after which the indicator is bodily moved so that the pointer $d^3$ will be at "9." Then it will be found that the end $d^6$ will indicate the result "3." Thus it will be seen that in order to solve a given problem the indicator is inserted in the grooves of the scale in two positions, in the first of which the index-point $d^3$ is placed opposite the denominator $b$ of a fraction and the point or end $d^6$ is set opposite the numerator $a$. Then in the second position the indicator is placed in the proper groove, so that the index-point $d^3$ will be at $c$, (which is the number multiplied by the fraction $\frac{a}{b}$,) and then the $d^6$ will indicate the answer.

I claim as my invention—

1. A logarithmic scale consisting of a number of parallel sections and a movable indicator constructed to coact herewith, and separate guiding means for each section of the scale for positively guiding said indicator, substantially as described.

2. The combination of a plurality of logarithmic scales definitely arranged with relation to each other, and a movable indicator constructed to coact therewith, and separate guiding means for each scale for positively guiding said indicator, substantially as described.

3. The combination of a plurality of logarithmic scales arranged adjacent to one another, both side by side and, respectively, above and below each other, the distance of the last line of an upper scale from the first line of the scale below it being the same as the distance between successive lines of the scales, and the second line of each right-hand scale being placed in juxtaposition to the end of the first line of the scale to the left thereof, and a movable indicator adapted to coact therewith, and separate guiding means for each scale for positively guiding said indicator, substantially as described.

4. A logarithmic scale consisting of a number of parallel sections and a bodily-movable indicator therefor, there being a groove-and-projection connection between the indicator and the scale-sections, substantially as described.

5. The combination of a supporting-body, a logarithmic scale thereon divided into a number of sections placed parallel with each other, said body having a groove for each scale-section, and a movable indicator for the scale having a projection or projections constructed to coact with said grooves, substantially as described.

6. The combination of a supporting-body, a plurality of logarithmic scales thereon, each divided into a number of parallel sections, and an indicator coacting with said scale, the sections of the scales having guiding means for the indicator, substantially as described.

7. The combination of a logarithmic scale, a supporting-body therefor, said scale being divided into a number of parallel sections, and an indicator for said scale, said indicator consisting of a plurality of arms movably connected together, and separate guiding means for each scale for positively guiding said indicator, substantially as described.

8. The combination of a supporting-body, a logarithmic scale thereon divided into a number of parallel sections, and an indicator for said scale including a base-bar having an index-point and a plurality of bars movably carried by said base-bar, one of said bars having an indicating-point, and separate guiding means for each scale for positively guiding said indicator, substantially as described.

9. The combination of a supporting-body with a plurality of logarithmic scales thereon divided into a number of parallel sections, an indicating-bar including a base-piece, separate guiding means for positively guiding said base-piece in lines parallel to the scale-sections, with an indicating-pointer movably carried by said base-bar, substantially as described.

10. The combination of a supporting-body having in it a series of parallel grooves, a scale on said body divided into sections definitely arranged relatively to said grooves, an indicator having a portion or portions coacting with the grooves, said indicator including a base-bar having an index-pointer, and a relatively movable pointer carried by said base-bar, substantially as described.

11. The combination of a supporting-body having in it a series of parallel grooves, a plurality of scales on said body definitely arranged relatively to said grooves, with an indicator having a portion or portions coacting with the grooves and including a base-bar provided with an index-pointer, a second bar pivoted to the base-bar, and an indicating-pointer pivoted to said second bar, substantially as described.

12. The combination of a supporting-body having in it a series of parallel grooves, a plurality of scales on said body definitely arranged relatively to said grooves, with an indicator having a portion or portions coacting with the grooves and including a base-bar provided with an index-pointer, a second bar pivoted to the base-bar, and an indicating-pointer pivoted to said second bar, the joints between said bars having sufficient friction between their parts to maintain the bars in any set positions, substantially as described.

In testimony whereof I have signed my name to this specification in the presence of two subscribing witnesses.

JOHN WILKES.

Witnesses:
WALTER C. SHARP,
W. M. LEFTWICH.